United States Patent [19]

Tachibana et al.

[11] Patent Number: 5,261,596
[45] Date of Patent: Nov. 16, 1993

[54] AIR QUALITY CONDITIONING SYSTEM

[75] Inventors: Hirokazu Tachibana, Kyoto; Nobuyuki Yoshiike, Ikoma, both of Japan

[73] Assignee: Matsushita Electric Industrial Co., Ltd., Kadoma, Japan

[21] Appl. No.: 897,677

[22] Filed: Jun. 12, 1992

[30] Foreign Application Priority Data

Jun. 14, 1991 [JP] Japan ............................. 3-142946
Jun. 17, 1991 [JP] Japan ............................. 3-144495
Aug. 8, 1991 [JP] Japan ............................. 3-199402

[51] Int. Cl.$^5$ ............................................. F24F 7/00
[52] U.S. Cl. ................................ 236/49.3; 454/229; 454/256; 165/16
[58] Field of Search ................ 236/49.1, 49.2, 49.3; 454/256, 257, 229, 258; 340/573, 628, 632, 633, 634; 165/16

[56] References Cited

U.S. PATENT DOCUMENTS

| | | | |
|---|---|---|---|
| 4,257,319 | 3/1981 | Kucharczyk | 454/256 |
| 4,294,404 | 10/1981 | Gajjar | 236/49.3 |
| 4,567,939 | 2/1986 | Dumbeck | 236/13 X |
| 4,872,397 | 10/1989 | Demeter et al. | 454/229 |
| 4,914,924 | 4/1990 | Takahashi | 236/91 C |
| 4,960,041 | 10/1990 | Kiser | 236/49.3 X |
| 5,054,686 | 10/1991 | Chuang | 236/49.3 |
| 5,066,466 | 11/1991 | Holter et al. | 340/634 X |
| 5,084,659 | 1/1992 | Hayashi et al. | 236/49.1 X |

FOREIGN PATENT DOCUMENTS 2-232556 9/1990 Japan.

OTHER PUBLICATIONS

Naruaki Hayakawa, "Sensor Technology in Building Automation", Sensor Technology, Sep. 1990, pp. 41–46.

Primary Examiner—Harry B. Tanner
Attorney, Agent, or Firm—Cushman, Darby & Cushman

[57] ABSTRACT

An air quality conditioning system for adjusting an environmental air quality in an accommodation space comprises; a detection device for detecting the air quality; another detection device for detecting the temperature and humidity; a signal processor for identifying the causes for the change in the air quality of the accommodation space based on the outputs of said detection devices, and also determining the degree of the change based on the discomfort degree data for the air quality, with another function of correcting the outputs of said detection means for the temperature and humidity.

6 Claims, 11 Drawing Sheets

AIR QUALITY CONDITIONING SYSTEM

FIELD OF THE INVENTION AND RELATED ART STATEMENT

1. Field of the Invention

The present invention generally relates to an air quality conditioning system. Particularly, it is concerned with an air quality conditioning system which is capable of adjusting an air quality environment of an accommodation space, by detecting and discriminating causes for the change in the air quality of the accommodation space thus determining the degree of the changes, and by controlling an air conditioning apparatus, a ventilating apparatus, an air cleaning apparatus or any apparatus which is a combination of these apparatuses based on the results of the determination.

2. Prior Art

In the past, a thermal factor has primarily been mainly considered in view of the habitability of the accommodation space, and a number of technologies have been accumulated with respect to the thermal control of the space. A great number of technologies, apparatuses and systems have also been developed for the thermal control of the space. On the other hand, building have recently been configured more and more as highly hermetic sealed, both in office buildings and in private houses, in order to achieve a high efficiency and an effective energy consumption in the air conditioning. As a consequence, it has been appreciated that a satisfaction by the occupant in the accommodation space cannot necessarily be obtained, only by the thermal control. Namely, a problem of accumulation of carbon dioxide or various kinds of odor factors, which might have been further increased by the various activity of human occupants, has recently been paid attention owing to the recent diffusion of high degree hermetically sealed structures. The accumulated gases might deteriorate the air quality of the accommodation space, and thus might increase the discomfort sensed by the human occupants therein and might injure their health.

As a result of diversified research conducted for these circumstances, carbon dioxide has been proposed as a practical indicator substance for evaluating the air quality and has actually been evaluated for investigation in various fields. As a means for measuring the carbon dioxide concentration, non-dispersed infrared analysis is frequently used. And such a method has been widely employed for maintaining and controlling the air quality as ventilating the accommodation space for the required quantity, calculated on the basis of the measured concentration of the carbon dioxide as compared with a threshold value.

However, there are a number of cases wherein the evaluation of the air quality is not made satisfactorily only by controlling the carbon dioxide concentration and the discomfort remains even when the carbon dioxide concentration is retained to a sufficiently permissible range. The cause of the discomfort is found in the various odor substances generated directly from the human body, from tobacco smoking, and from the interior building material. Still other causes are the various volatile matters, mainly of smoking origin, being once absorbed by and retained in or on the interior building material or the like and accumulated therein and then released therefrom. In order to cope with these circumstances and to improve the habitability of the environmental air quality, various air conditioners and air cleaners have been introduced. However, the operations of these conventional air conditioners, air cleaners and ventilators have been controlled individually based on the initially set individual conditions. Thus, it is substantially impossible to conduct a real-time control which is actually effective for coping with the delicate change in the actual air quality.

SUMMARY AND OBJECTS OF THE INVENTION

In view of these circumstances, the present inventors have now proposed an air quality conditioning system capable of adjusting the environmental air quality in an accommodation space. The system can discriminate and detect the causes for the change in the air quality of the accommodation space thus determining the degree of the change, and thereby can delicately and satisfactorily control of at least one of an air conditioning apparatus, a ventilating apparatus, an air cleaning apparatus any apparatus built by combining the functions of these apparatuses, based on the results of the determination.

According to the present invention, there is provided an air quality conditioning system comprising:

an air quality detection device for detecting the air quality constituted with at least three factors i.e., the presence of a human occupant in an accommodation space, smoking, and background odor, and for outputting the detection signals;

a signal processor having a function of at least identifying the cause for the change in the air quality based on the output signals issued from said air quality detection device, determining the degree of the change in the air quality based on a discomfort degree data for the air quality, and issuing processed signals; and a control device for controlling the operation of an air conditioning apparatus comprising at least one of an air conditioner, ventilator, air cleaner and any apparatus built by combining these apparatuses, based on the processed signals As the main constituents of the air quality, three factors are picked up here. The three factors are (i) the presence of the human occupant who generates body odor (hereinafter, to be simply referred to as "presence"), (ii) the tobacco smoking, and (iii) the background odor in the accommodation space. The background odor is defined so as to include odor substances which have originally been contained in the interior building and furniture materials, and any retentive odor substances of the body odor origin and the smoking origin retained on the internal faces of the accommodation space and furnitures.

The identification of the causes of the change in the air quality can be achieved relatively easily by employing sensors for selectively detecting the gaseous constituents which are the causes for the change in the air quality. On the other hand, the judging or measurement of the degree of the change in the air quality can be made easily by quantitatively monitoring the outputs of these sensors. When the outputs of these sensors reach the previously determined levels or values, which are derived or determined from their correspondence with various level and/or the threshold level of discomfort in the air quality (discomfort degree), said sensors issue signals for driving the air conditioner and the like to a control device. The threshold level of the discomfort in the air quality can be determined by the method of notification test. The correspondences between the discomfort degree and the sensor outputs are obtained relatively easily. Therefore, it is possible to finely divide the level of the sensor outputs based on the discomfort level in the air quality, and to conduct fine adjustments of operating conditions of the apparatus in response to the degree of the change in the air quality.

In the above-described system, said air quality detection device may preferably include a sensor for detecting carbon dioxide, and said signal processor may have a function of determining the presence of human occupant in the accommodation space based on the output signal from said sensor.

Further, said air quality detection device may preferably comprise at least one of a sensor for detecting carbon monoxide and a sensor for detecting hydrogen, and said signal processor may have a function of determining a state of the smoking in the accommodation space, based on the output signal from said sensor.

Moreover, said air quality detection device may preferably comprise at least one sensor for detecting organic solvents, a sensor for detecting volatile nitrogen-containing compounds, and a sensor for detecting volatile sulfur-containing compounds, and said signal processor may have a function of determining a state of background odor in the accommodation space, based on the output signal from said sensor.

Said air quality detection device may further comprise a means for detecting temperature and humidity of the accommodation space and said signal processor may perform correction on the outputs from said air quality detection means for the temperature and humidity.

In addition to these, said signal processor may further include a fuzzy inference function and may be capable of determining the level of the air quality on the basis of fuzzy inference.

The present invention is capable of performing an adequate and delicate control on the air quality in response to the actual change in the air quality.

By employing the system built in accordance with the present invention, the identification of the causes for the change in the air quality and the determination of the degree of the change in the air quality can be performed in levels closer to the human sense in the real-time response. Therefore, the system is advantageous in adequately controlling the air conditioner and the like apparata and in maintaining the air quality of the accommodation space to a pleasant level.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

In the following paragraphs, the configuration and the operation of the system in accordance with the present invention will be described with reference to the preferred embodiments shown in the attached drawings.

EXAMPLE 1

Figure 1:
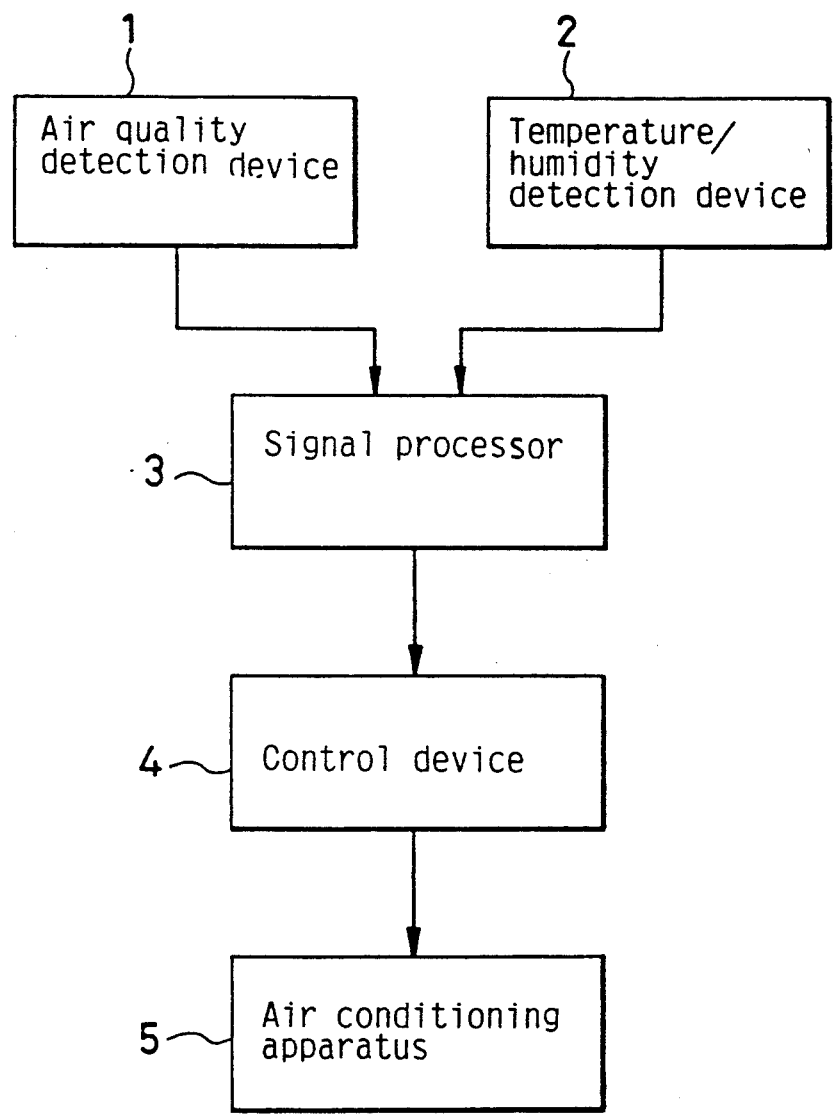
FIG. 1 is a block diagram showing an embodiment of the air quality conditioning system built in accordance with the present invention.

FIG. 1 is a block diagram showing a fundamental example of the system built in accordance with the present invention. The system generally comprises an air quality detection device 1, a temperature/humidity detection device 2. A signal processor 3 is connected to receive output signals of the air quality detection device 1 and the temperature/humidity detection device 2. A control device 4 receives an output signal of the signal processor 3 and issues a control signal to an air conditioning apparatus 5.

The air quality detection device 1 detects the air quality, and the temperature/humidity detection device 2 detects the temperature and humidity of the accommodation space to be controlled. The signal processor 3 analyzes and identifies the kinds of air quality change, based on the outputs of the air quality detection device 1 and of the temperature/humidity detection device 2. The signal professor 3 also simultaneously determines the degree of change in the air quality based on the stored discomfort degree data of the air quality and corrects the results of the determination for temperature and humidity. By receiving the output of the signal processor 3, the control device 4 controls the air conditioning apparatus 5, which is an air cooler/warmer apparatus, ventilating apparatus, air cleaning apparatus or any apparatus built by combining these apparatuses.

In this embodiment, the air quality detection device comprises; a carbon dioxide sensor for detecting the state of the presence, a carbon monoxide sensor for detecting the state of smoking, and an alcohol sensor for detecting the state of the background odor. The carbon dioxide sensor is a known $Na^+$ ion-conductive solid state carbon dioxide sensor which is disclosed in, for instance, Tokkaihei (Japanease Unexamined Patent Publication) 2-232,556 (hereinafter, to be simply referred to as carbon dioxide sensor). The carbon monoxide sensor is a known $SnO_2$ semiconductor carbon monoxide sensor which is commercially available from Figaro Giken K. K., Japan under the name "Figaro Giken TGS 203" (hereinafter, to be simply referred to as carbon monoxide sensor). The alcohol sensor is a known $SnO_2$ semiconductor alcohol sensor which is commercially available from the same company under the name "Figaro Giken TGS 822" (hereinafter, to be simply referred to as alcohol sensor) which is sensitive for organic solvents. As the means for detecting temperature, a ceramic thermistor available from TDK K. K., Japan under the name "TDK NTC 103" is employed and, as the means for detecting humidity, a ceramic humidity sensor which is available from Matsushita Electronic Component K. K., Japan under the name "EYH H02N" is employed.

Further, an advantage similar to that of the sensor for detecting the state of the smoking will be obtained by employing a hydrogen sensor which selectively detects hydrogen generated by the smoking. As the sensor for detecting the background odor, a sensor for detecting volatile nitrogen-containing compounds or a sensor for detecting volatile sulfur-containing compounds may also be employed. The above-mentioned temperature sensor and the humidity sensor are only exemplary, and any other sensors of different type and made of any other materials may also be employed for the same purposes. Further, although the system of the present invention can be constituent with as many sensors as the numbers of the constituent factors in the air quality, a hybrid sensor built by combining a number of sensors on a single-tip device may be substituted for the corresponding numbers of the discrete sensors. By doing so, very compact design of the system may be realized.

In addition to these detection devices, any other detection devices such as optical gas detection devices and chemical gas detection device may also be employed, as far as they are suitable for the purposes and the scales of the desired measurements.

In the following paragraphs, the basic operation of the thus configured air quality conditioning system will be elucidated with reference to the fundamental flow chart shown in FIG. 1A. With the start (Step 201) of the system, the time measurement (Step 202) is initiated. This is accomplished by previously setting, for instance, a timer. In a case where the result of the time measurement is "YES", the system is in its operating period (in this embodiment, e.g., a continuous operation for 12 hours is set) wherein the detections of the air quality (Step 203) and of the temperature and humidity (Step 204) are performed by the gas sensors, thermister and humidity sensor, respectively. If the result of the time measurement is decided as "NO", then the operation of the system is stopped (Step 200). Next, the correction on the respective outputs of the gas sensors are performed (Steps 205) for the detected temperature and humidity. Thereafter, the respective corrected outputs are compared (Steps 206, 207 and 208) with the threshold outputs which have previously been determined for the respective factors of the referential air quality. As a result the causes of the change in the air quality are identified, and the degree of the change is determined (Steps 206, 207 and 208).

Next, the manner of the decision for each of the factors in the air quality will now be elucidated concretely.

First, the identification and decision for the presence are performed (Step 206) on the concentration of the carbon dioxide, and the decision is classified into the subdivision as summarized in TABLE 1 below.

TABLE 1

| Carbon Dioxide Concentration ($CO_2$: ppm) | State of Presence |
| --- | --- |
| $CO_2 > 1000$ | Presence A |
| $1000 \geq CO_2 > 500$ | Presence B |
| $500 \geq CO_2$ | Absence |

In TABLE 1, "Presence A" means that the air quality under the measurement requires ventilation and "Presence B" means that the air quality under the measurement is relatively deteriorated but does not requiring ventilation. "Absence" is a level of the carbon dioxide concentration in a common accommodation environment of a highly hermetic compartment, and corresponds to a state in which there is substantially no deterioration in the air quality.

The identification of the smoking (Step 207) and the decision of the background odor (Step 208) are performed based on the outputs of the carbon monoxide sensor and the alcohol sensor, respectively, whereby a subdivision on the decision is made. In the subdivision, the effect of the combination of the output levels of the both sensors is also taken into account, and the decision is summarized as shown in TABLE 2 below.

TABLE 2

| Output of the Carbon Monoxide Sensor | Output of the Alcohol sensor | Air Quality State |
| --- | --- | --- |
| $V_{CO} \geq 1.5 V_{COO}$ & $V_{AL} \geq 1.2 V_{ALO}$ | | Smoking |
| $V_{CO} \geq 1.5 V_{COO}$ & $V_{AL} < 1.2 V_{ALO}$ | | Background, Good |
| $V_{CO} < 1.5 V_{COO}$ & $V_{AL} \geq 1.2 V_{ALO}$ | | Background, Poor |
| $V_{CO} < 1.5 V_{COO}$ & $V_{AL} < 1.2 V_{ALO}$ | | Background, Good |

In Table 2, $V_{CO}$ represents the output of the carbon monoxide sensor and $V_{AL}$ represents the output of the alcohol sensor. Further, $V_{COO}$ represents the output of the carbon monoxide sensor of the reference level (in the clean atmosphere) and $V_{ALO}$ represents the output level of the alcohol sensor of the reference level (in the clean atmosphere). Furthermore, the threshold output levels for the smoking and the background odor employed in the decision are determined by the previously obtained relationship between the sensor outputs and the discomfort degree. In this embodiment, the levels that 20% of the human occupants feel discomfortable are taken as the threshold levels. Practically, the threshold levels of the smoking and the background odor employed for the decision are determined as 1.5 $V_{COO}$ and 1.2 $V_{ALO}$, respectively. In case where the smoking is actually performed, various gas components such as hydrogen, alcohols and aldehydes are actually evolved together with the carbon monoxide, and thus both the output levels of the carbon monoxide sensor and the alcohol sensor are simultaneously increased. Therefore, the decision of "Smoking" is derived only in the case of "$V_{CO} \geq 1.5 V_{COO}$ & $V_{AL} \geq 1.2 V_{ALO}$". Since the case of "$V_{CO} \geq 1.5 V_{COO}$ & $V_{Al} < 1.2 V_{ALO}$" is a result that $V_{CO}$ is affected by the changes in the temperature and humidity, the decision is selected "Background, Good" instead of "Smoking". Other combinations are subdivided into the class summarized in TABLE 2.

In accordance with the decisions, "Presence A", "Smoking", and "Background, Poor", derived by comparing the sensor outputs with the threshold values in Steps 206, 207 and 208, the appropriate control signals are outputted (Step 210) and the air conditioner is driven (Step 211) as shown in the subdivision in TABLE 3 below.

TABLE 3

| Result of the Decision | Control |
| --- | --- |
| Presence A | Ventilation mode operation |
| Smoking | Air-cleaning mode operation (power) |
| Background, Poor | Air-cleaning mode operation (moderate) |

Figure 1A:
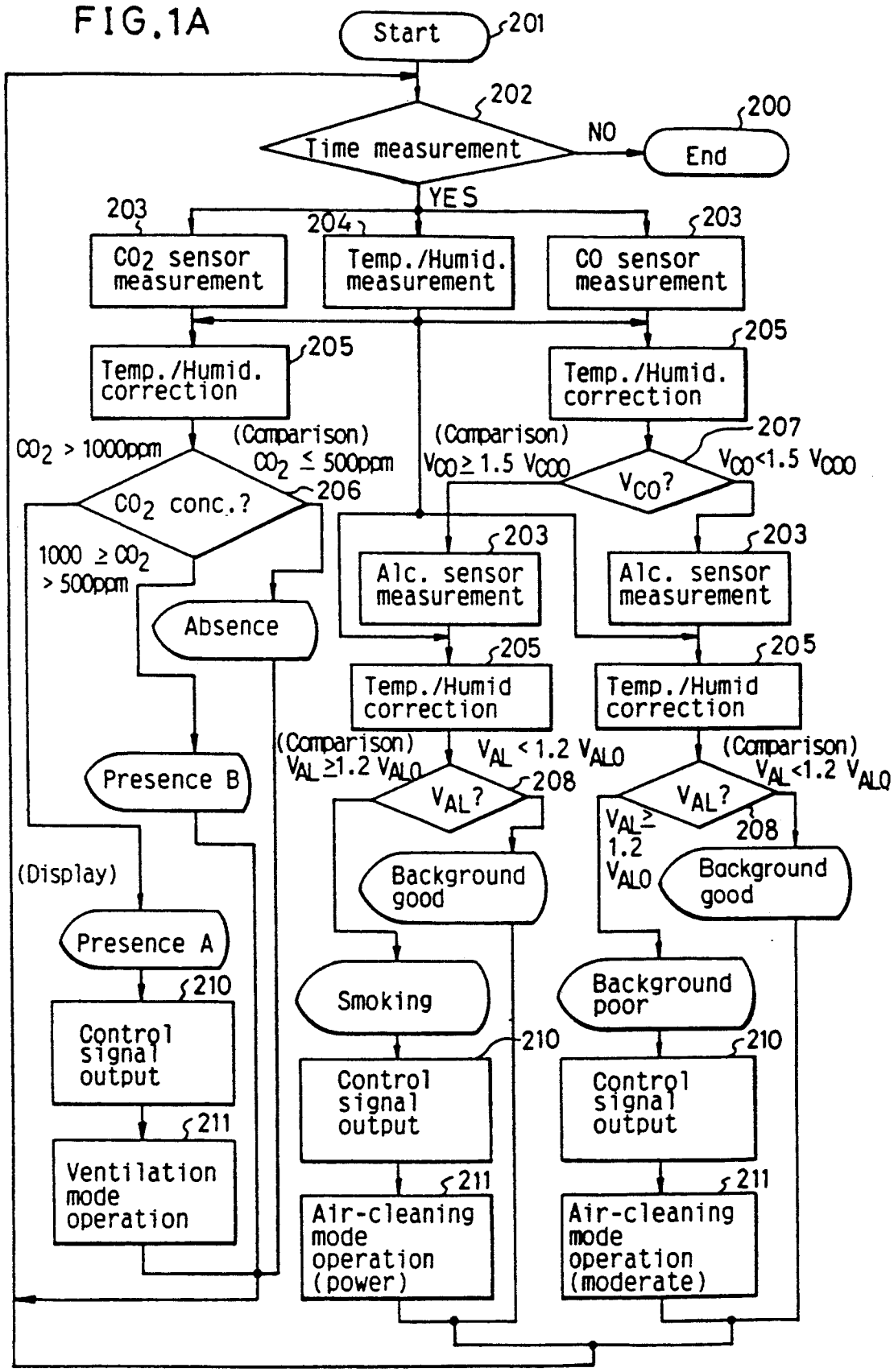
FIG. 1A is a flow chart showing a fundamental flow of the embodiment of FIG. 1.

Although the driving control of only the air conditioning apparatus is sufficient as a minimum requirement of this system, it is further preferable to configure the system to include a visual information display device as shown in FIG. 1A, which can attract the attention of or be noticed by the human occupant. This can be accomplished by additionally providing such an information display device capable of displaying the results of the decision and operation in the accommodation environment.

Further, it is also possible to more finely divide the degree of the change in the air quality and thus to control more finely the respective capacities of the air conditioner in the ventilation mode operation and in the air cleaning operation.

EXAMPLE 2

In order to confirm the function of the air quality conditioning system of this embodiment, a measurement is made on the change in the air quality attributable to the presence load.

The measurement was performed in a room of an approximate dimension: $1.5 \times 2 \times 2.2$ m equipped with an air conditioner with ventilation function and air cleaning functions (hereinafter, to be simply referred to as air conditioner). The sensors were installed on a side wall of the room and at points of approximately 1.5 m above the floor. Depending on the subject matters of the experiments, the initial experimental conditions were set in a manner that the air quality of the room was made to be constant for each measurement. This was accomplished by driving the air conditioner for a given time period immediately before the measurement, and thus making the outputs of the respective sensors to be at the reference levels of the atmosphere to be measured. Therefore, the initial output of the alcohol sensor is regarded to be the reference level $V_{ALO}$ of the background odor in these cases.

Figure 2:
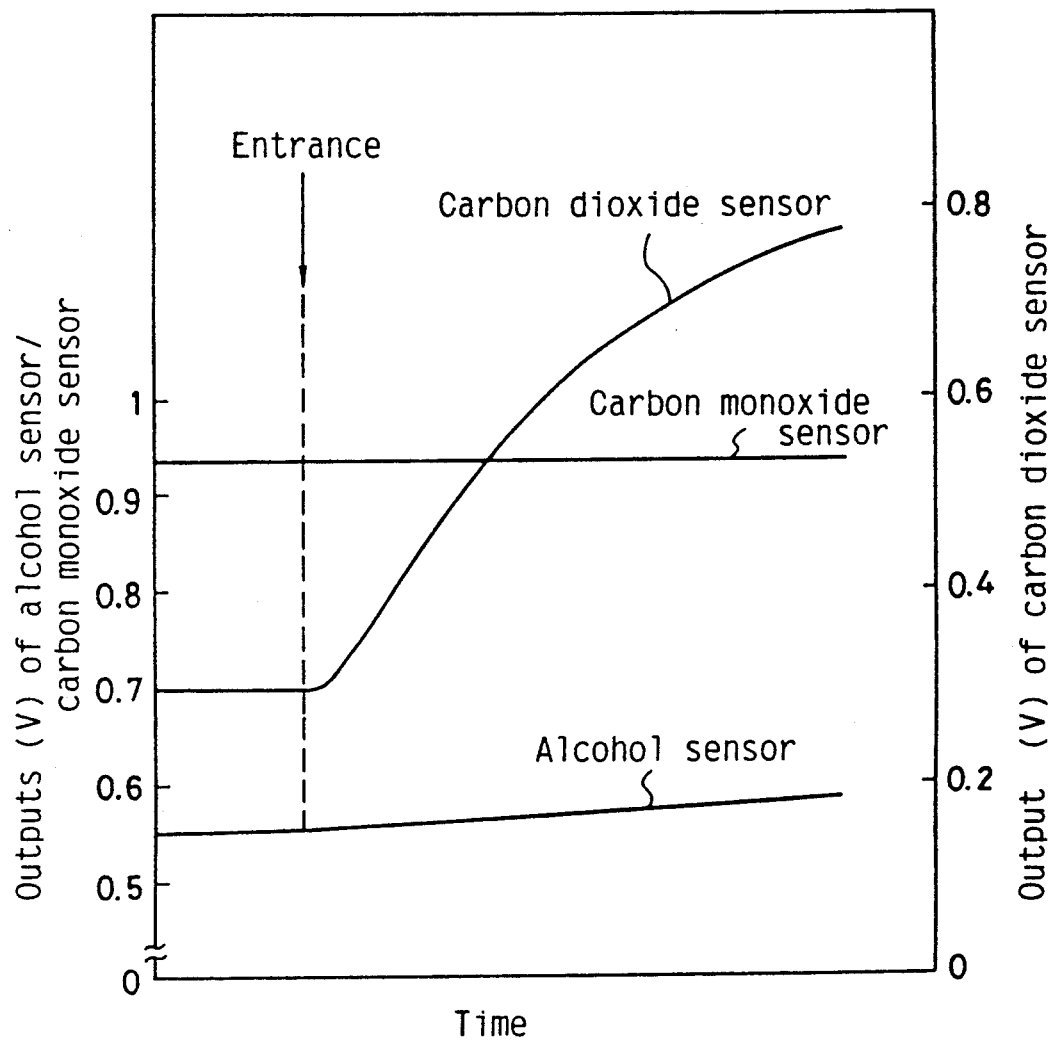
FIG. 2 is a graphic representation the output patterns of the sensors included in the system of the present invention which detect the presence.

FIG. 2 shows the changes of the outputs of the respective sensors caused by an entrance of a human occupant into the measurement room. A temperature: about 20° C. and a relative humidity: about 60% RH were set for the measurement room. The output level of the carbon dioxide sensor began to change a short time after the entrance of the human occupant and showed an increasing tendency with the lapse of time. When the density of carbon dioxide increases, the output level of the carbon dioxide sensor decreases in the actual device. Therefore, in the present invention, the circuit for processing the output of the carbon dioxide sensor is configured so that when the density of carbon dioxide increases, the output level of the carbon dioxide sensor increases. Later on, the output level of the alcohol sensor showed a tendency of slight increase. On the other hand, substantially no change was appreciated in the output level of the carbon monoxide sensor.

It is therefore found that, by utilizing these characteristics of the sensors, it is possible to detect the change in the air quality attributable to the existence (entrance—presence) of the human occupant from the output pattern of the carbon dioxide sensor and to determine the degree of the change in the air quality from the output level of the carbon dioxide sensor. It is also possible to determine the level of the background odor together with the body odor constituent by the output level of the alcohol sensor.

EXAMPLE 3

Figure 3:
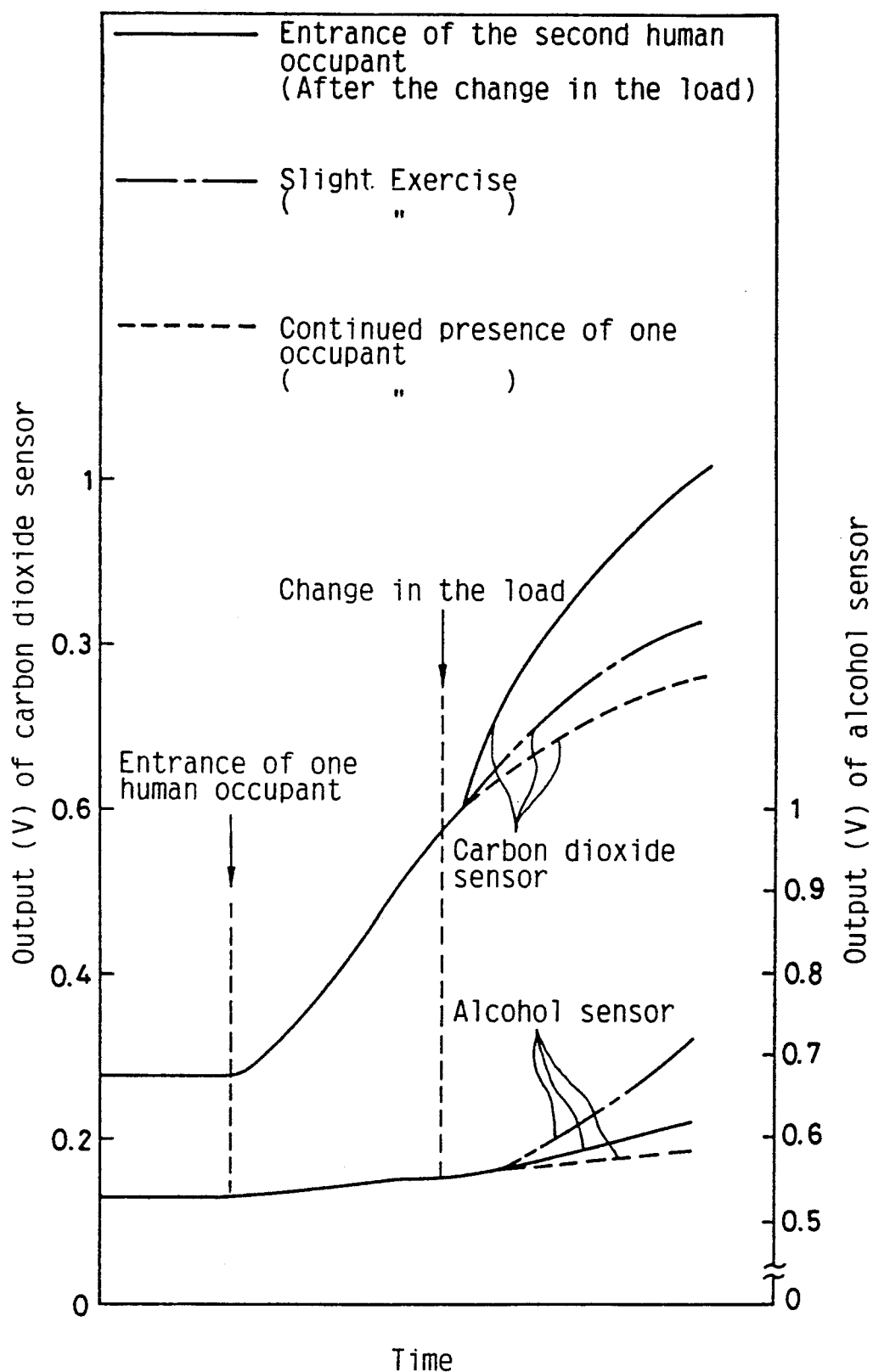
FIG. 3 is a graphic representation of the output patterns of the sensors included in the system of the present invention which respond to the change in the presence load.

In this embodiment, a measurement was performed on the change in the air quality attributable to the change in the presence load. FIG. 3 shows the changes in the outputs of the respective sensors in the case wherein the human occupant performs a light exercise and in the case wherein another human occupant additionally enters into the measurement room. The conditions of the temperature and humidity were the same as that in Example 1. In case of the light exercise (represented by the single-dot chain curve), the change in the output of the carbon dioxide sensor was small, whereas that in the output of the alcohol sensor was relatively large. Namely, it shows that the evolution of alcohols, aldehydes, and various volatile organic acid from the human body is made brisk with the change in the activity of the human, and thus the change in the air quality attributable to the body odor becomes large. On the other hand, in the case of additional entrance of the occupants (represented by the solid curve), the change in the output of the carbon dioxide sensor is large whereas the change in the output of the alcohol sensor is small. In FIG. 3, both the broken curves represent the changes in the sensors in the case wherein only one human occupant continues present in the measurement room.

By utilizing these characteristics, it is possible to detect the changes in the load on the measurement room, and based on this data to conduct the air quality conditioning in response to the speed and degree in the temporal change in of the air quality.

EXAMPLE 4

Figure 4:
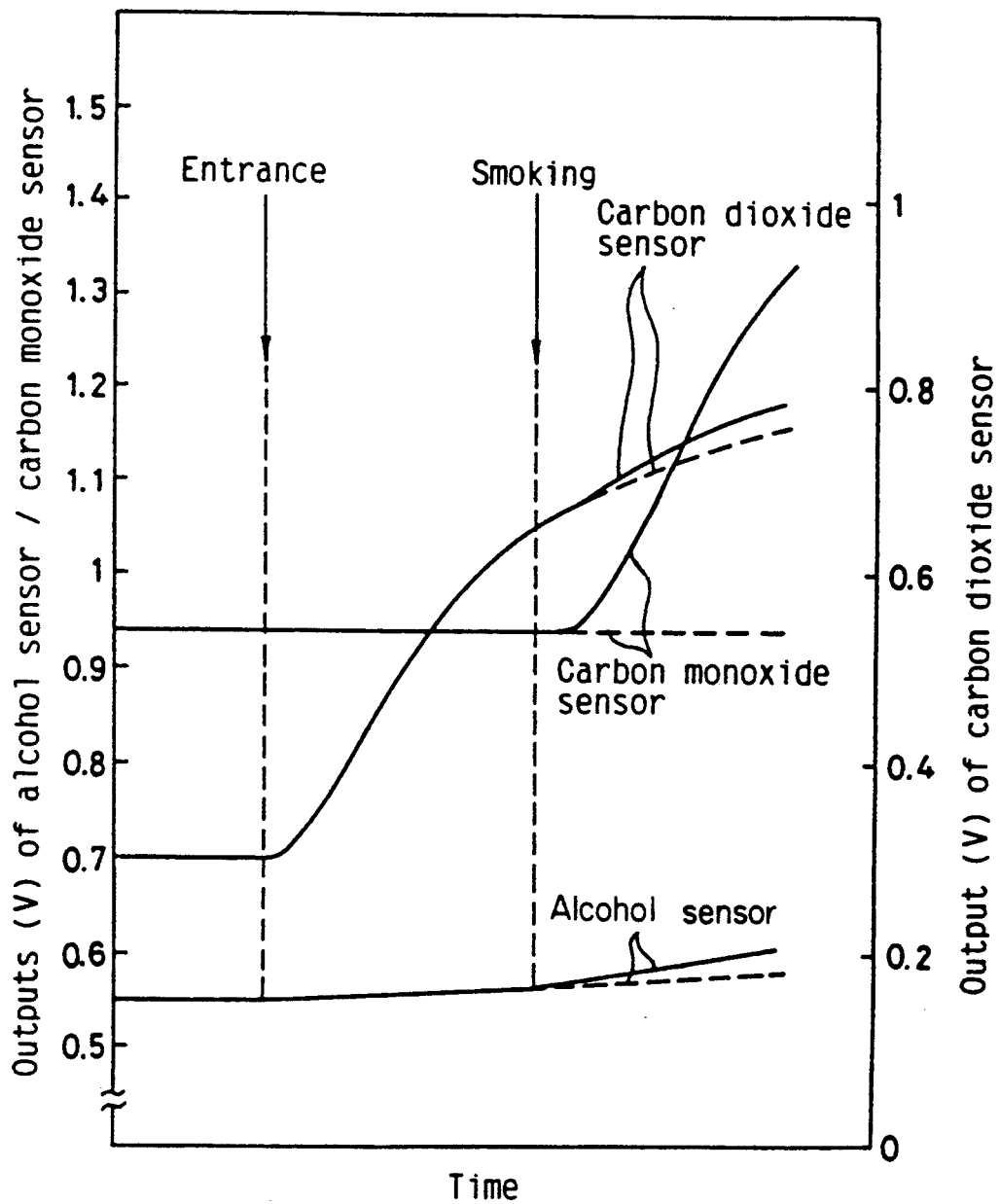
FIG. 4 is a graphic representation of output patterns of the sensors included in the system of the present invention which detect smoking.

Another measurement was performed on the change in the air quality in the case wherein the human occupant smokes tobacco. FIG. 4 shows the changes in the outputs of the respective sensors in that case. The conditions of the temperature and humidity were also similar to that in Example 1. When the carbon monoxide sensor detected the smoking, it showed an output pattern of rapid increase. By utilizing this characteristic of the carbon monoxide sensor, it is possible to identify the cause of the change in the air quality to be the smoking and to determine the degree of the change. Since the concentration of the carbon dioxide does not remarkably increase by the smoking, there is appreciated only slight change in the output of the carbon dioxide sensor. Although some change is noticed in the output of the alcohol sensor, this is attributable to the fact that the sensor detects a minute amount of aldehydes generated by the smoking. This can be processed as the change in the level of the background odor. In FIG. 4, the broken lines represent the output characteristics of the respective sensors in the case where no smoking is performed.

Figure 5:
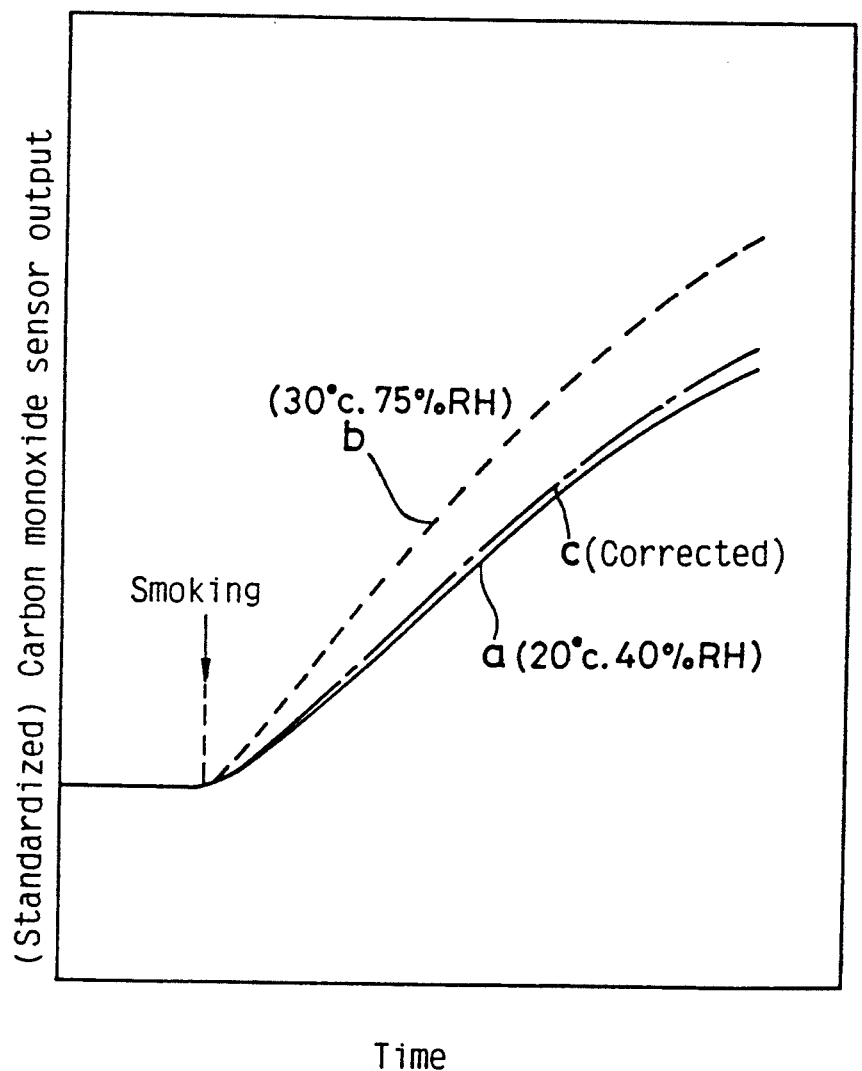
FIG. 5 is a graphic representation showing the effect of the ambient temperature and humidity on the output patterns of the smoking detection characteristics of the sensor included in the system of the present invention.

FIG. 5 shows the output characteristics of the carbon monoxide sensor in detecting the smoking under the respective conditions of atmospheric temperature and humidity. The solid curve: "a" represents the case of 20° C.-40% RH, the broken curve: b represents the case of 30° C.-75% RH and the single-dot chain curve: c represents the case wherein corrections are made for that of 30° C.-75% RH based on that of 20° C.-40% RH. From these curves, it is observed that the response characteristics of the gas sensor varies considerably with the differing temperature and humidity conditions but that the effect due to the differing conditions can be made small by correcting the characteristics for the temperature and humidity. Although not shown in the drawing, a similar correcting process as that on the carbon monoxide sensor can likewise be performed on the temperature and humidity dependencies of the carbon dioxide sensor and the alcohol sensor. As the human sense of the discomfort degree in the air is similarly dependent on the temperature and humidity, likewise is the case of the sensor. Since the relationship of the discomfort degree with temperature and humidity in this case can previously be obtained, it is possible to perform the correction relatively easily by processing the signals in a microprocessor.

EXAMPLE 5

A simple air quality conditioning system was configured by employing the respective sensors. Since the temperature of the measurement room was 20°±5° C. and its humidity was 55±10% RH, a correction process was performed on the data for the temperature and humidity by taking the condition of 20° C.—55% RH as a reference condition.

The timing for outputting a signal for driving the air conditioner and its operational mode were set as follows:

[1] In case where the cause for the change in the air quality is judged (identified) as the presence of an occupant in view of the output pattern of the sensor, a driving signal for the air conditioner to initiate the ventilating mode is issued when the output of the carbon dioxide sensor reaches a threshold level (e.g. equivalent to the concentration of the carbon dioxide of 1,000 ppm), and an operation of ventilating mode is performed for a given time period.

[2] In case where the cause for the change in the air quality is judged to be the smoking, a driving signal for the air conditioner to initiate a stronger air cleaning mode is issued when the output of the carbon monoxide sensor reaches a threshold level (1.5 $V_{COO}$) which is experimentally selected 1.5 times as large as the reference level ($V_{COO}$), and the operation is continued for a given time period after the output of the detection device has returned to the level immediately before the detection.

[3] Concerning the background odor, when the output of the alcohol sensor reaches a threshold level (1.2 $V_{AL0}$) which is experimentally selected 1.2 times as large as the reference level ($V_{AL0}$), a driving signal for the air conditioner in a weaker air cleaning mode is issued, and the operation is continued for a given time period after the output has returned to the level immediately before the detection.

[4] When both the change in the air quality due to smoking and the change in the background odor are detected simultaneously, the signal for the smoking is issued. If these are detected in sequence, the signal for the first detected cause is given priority to the second cause, and the respective driving signals are issued in that sequence.

[5] When both the presence and the smoking or the change in the background odor are detected simultaneously or in sequence, the signals for these respective causes are issued at the time when the outputs of the sensors reach the threshold values of the respective sensors. The reference output level for judging and determining the air quality is determined carefully contemplating the relationship between the discomfort degree of the air quality at the reference state (20° C.—55% RH) and output characteristics of the respective sensors.

Figure 6:
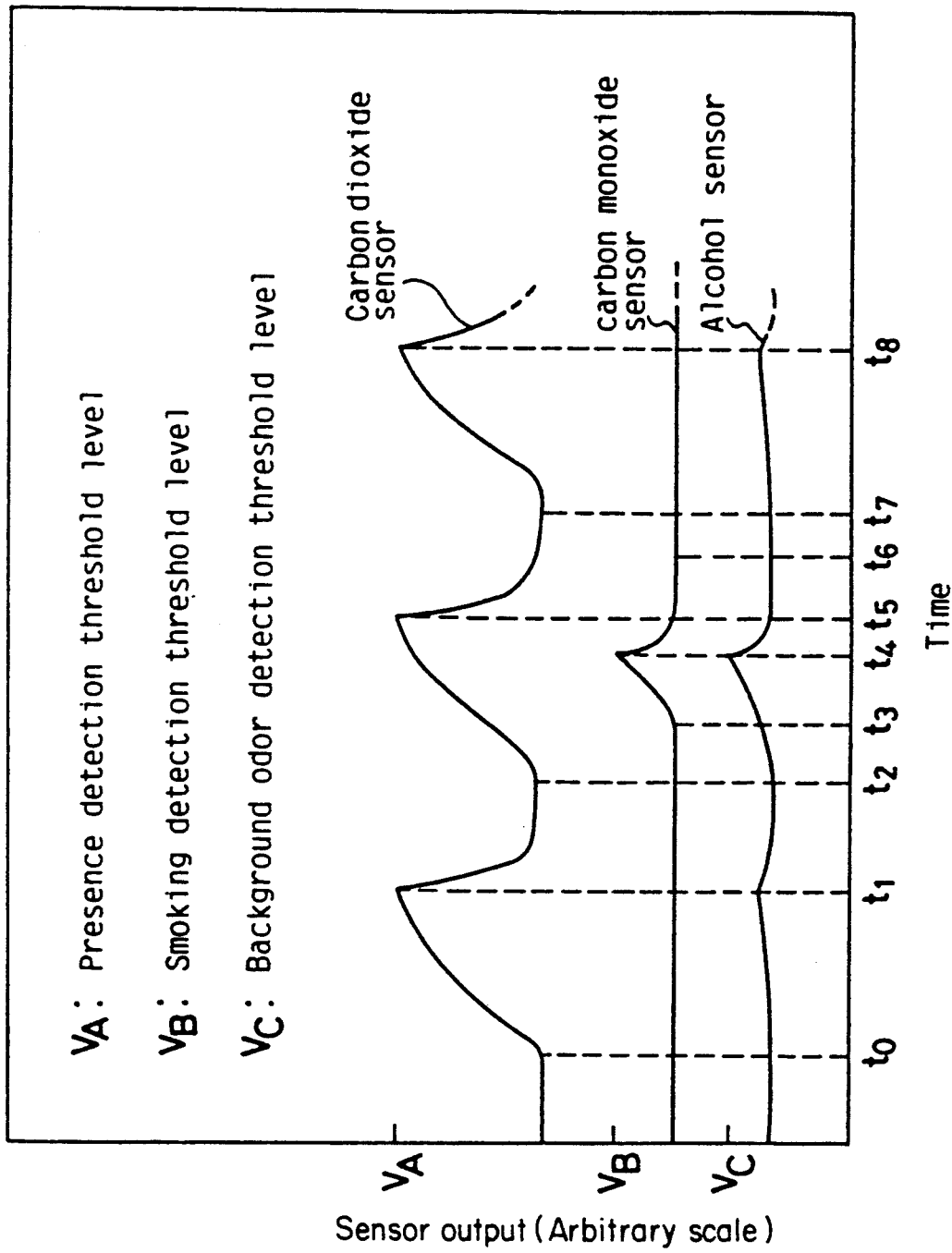
FIG. 6 is a graphic representation of output patterns of the sensors included in the system of the present invention, showing the operation of the system.

FIG. 6 shows the output patterns of the respective sensors in a situation where a human occupant enters the measurement room, and then smokes for a given time period, and thereafter continued to stay there, and the air conditioner is being automatically driven. In FIG. 6, which represents states of the measurement room wherein, the carbon dioxide sensor detects the presence of the occupant, the carbon monoxide sensor detects the smoking and the alcohol sensor detects the background odor respectively. At that time, the air conditioner is ready to perform the operations responding to the specified modes when the outputs of respective sensors reach the previously set threshold levels, whereby the air quality of the measurement room is restored to its initial level.

Referring to the curves of FIG. 6, the operation of the system will now be described in detail. Soon after an entrance of the human occupant at a time point $t_0$, the output of the carbon dioxide sensor begins to increase with detection of the presence. Then, the carbon dioxide sensor reaches the presence threshold level, and subsequently the system issues the driving signal in the ventilating mode to the air conditioner at a time point $t_1$ when the output reaches to the presence detection threshold level ($V_{CO2}$). With the return of the air quality to its initial state by the operation of the air conditioner for the given time period, the output of the carbon dioxide sensor decreases. When the ventilating mode operation of the air conditioner ends at a time point $t_2$, the carbon dioxide sensor begins to increase its output again by detecting the presence. Next, if before the output of the carbon dioxide sensor reaches the presence detection threshold level again. The human occupant begins to smoke at a time point $t_3$, the carbon monoxide sensor to begins to detect the smoking and to rapidly increase its output. When the output of the carbon monoxide sensor reaches its smoking detection threshold level (1.5 $V_{COO}$) at a time point $t_4$, the driving signal in the stronger air cleaning mode is issued from the sensor based on this data to actuate the air conditioner. In this case however, the output of the alcohol sensor also reaches to its background odor detection threshold level (1.2 $V_{ALO}$) at the time point $t_4$, but the signal processing is performed by placing the preference on the smoking to the background odor according to the previously determined control algorithm. Some time later, when the output of the carbon dioxide sensor reaches its presence detection threshold level at a time point $t_5$, the driving signal for the air conditioner in the ventilating mode is issued and the air conditioner begins to operate in its ventilating mode in addition to its stronger air cleaning mode. The operation of the air conditioner in its stronger air cleaning mode ends at a time point $t_6$, and the operation in its ventilating mode ends at a time point $t_7$, respectively. Provided that the human occupant ends his smoking during the operation of the air conditioner, the carbon dioxide generated by the aspiration of the human occupant becomes the main cause for changing the air quality after the time point $t_6$ when the air conditioner ends its operation in the stronger air cleaning mode. After the time point $t_7$, when the air conditioner ends its operation in the ventilating mode, the output of the carbon dioxide sensor increases and reaches its presence detection threshold level at a time point $t_8$, and the carbon dioxide sensor issues the driving signal in the ventilating mode thereby to cause the air conditioner to operate in that mode. In this sequence of operation, since the background odor attributable to the presence of the human occupant had decreased by the operation of the air conditioner in its ventilating mode, the output of the alcohol sensor did not reach its detection threshold level ($1.2\ V_{ALO}$) except for the case wherein the smoking occurred.

As has been clearly demonstrated, the air quality conditioning system in accordance with this embodiment functions so as to precisely grasp the causes for the change in the air quality as well as its degree, controlling the operation of the air conditioner based on the data of the causes, and maintaining the environmental air quality to a constant level.

EXAMPLE 6

In this embodiment, a fuzzy inference function is introduced into the signal processor and the degree of the change in the air quality is determined by the fuzzy inference. The operation of this system will now be described with reference to the embodiment shown in the block diagram of FIG. 7 as follows. The system comprises an air quality detection device 11, a sense data memory 12, a signal processor 13, a known fuzzy inference means 24 (e.g., realized by an IC), a control means 14 and an air conditioning apparatus 15. The air quality detection device 11 includes a presence sensing element 11a, a background odor sensing element 11b, a temperature sensing element 11c and a humidity sensing element 11d. The temperature sensing element 11c and the humidity sensing element 11d are added to give correcting factors. The sense data memory 12 stores as reference data the sense data derived from experience or notification by a human concerning threshold level of making an average person discomfort with respect to the air quality. The signal processor 13 performs processing to find the identification of the causes of the change in the air quality based on the data given by the air quality detection device 11, and makes the standardization of its outputs. The fuzzy inference means 24 receives the standardized output from the signal processor 13 and sense data from the sense data memory, and determines the level of the air quality, based on the standardized output of the signal processor 13 and the sense data stored in the sense data memory 12. The control means 14 receives the output of the fuzzy inference 24 and controls the air conditioning apparatus 15. The air conditioning apparatus includes an air conditioner, ventilator, air cleaner, or any apparatus built by combining these apparata.

Although the description in this EXAMPLE 5 is limited to those cases wherein the outputs of the air quality detection device 11 are standardized, it is also possible to input the individual outputs from the air quality detection device 11 as they are to the fuzzy inference means 24, without undergoing the standardization in the signal processor 13.

Figure 7:
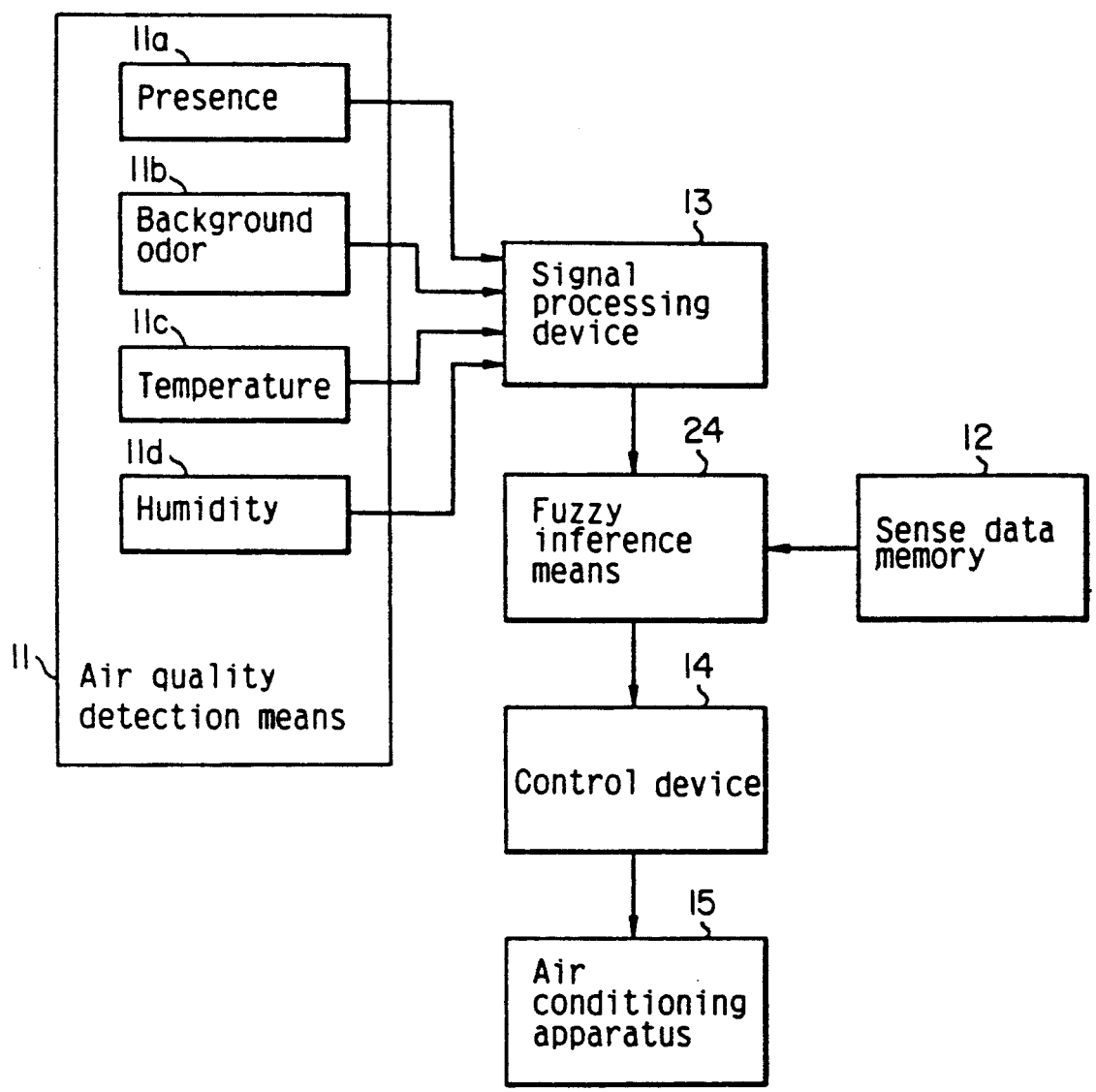
FIG. 7 is a block diagram showing another embodiment of the air quality conditioning system built in accordance with the present invention, which further includes a fuzzy inference function.
Figure 8:
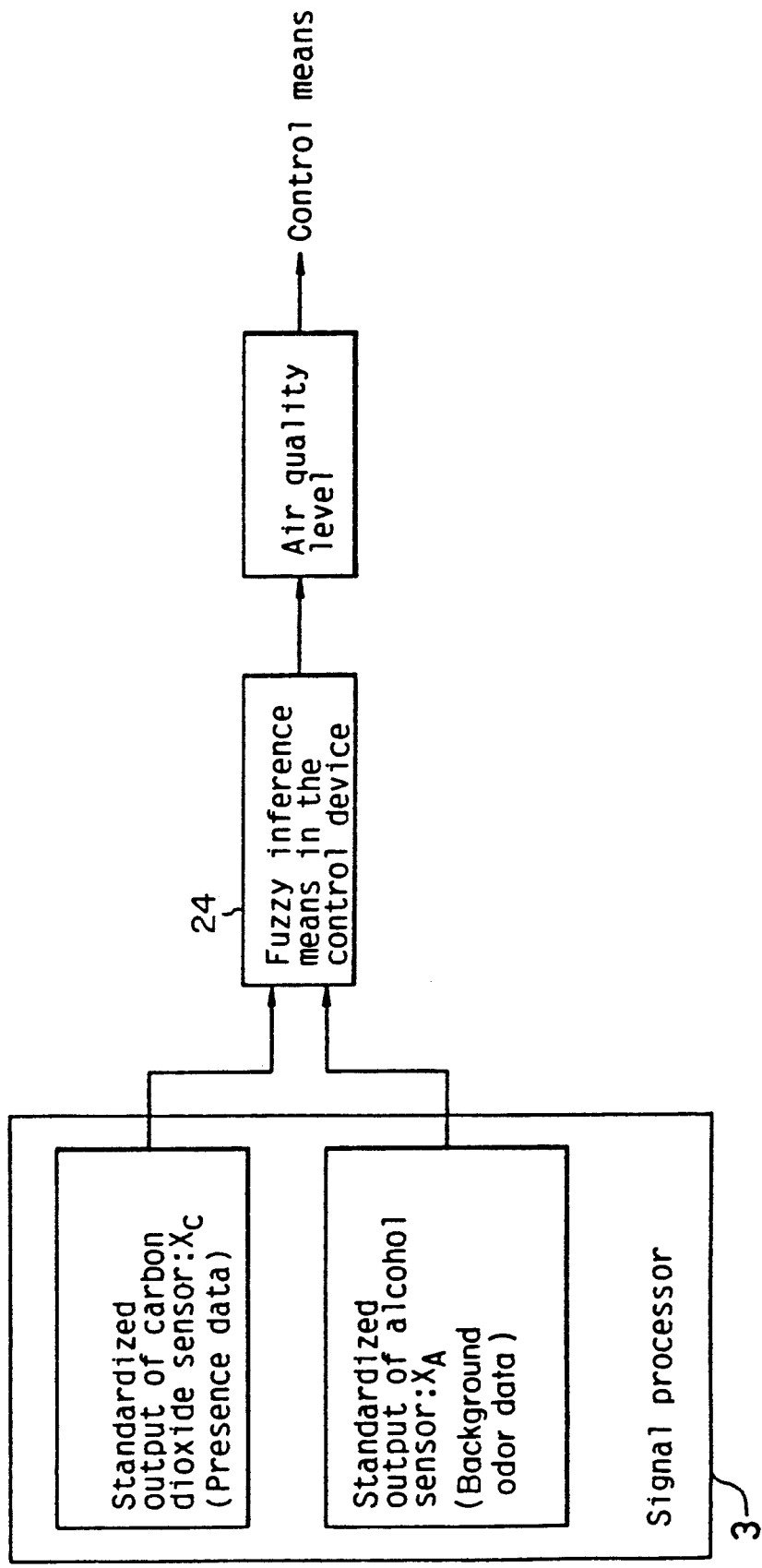
FIG. 8 is a block diagram illustrating the manner of the fuzzy inference.

For clarity and ease of illustration, only two outstanding sensing of the presence 11a and of the background odor 11b are picked up as the factors for constituting the air quality in this embodiment as shown by 1 in FIG. 7, the temperature (11c) and the humidity (11d) are added only as correcting factors. The same sensors as those of Example 1 are employed in the embodiment. FIG. 8 is a block diagram for briefly illustrating the fuzzy inference. The fuzzy inference means 24 in this figure comprises a microprocessor which is programmed to execute the fuzzy inference, a circuitry including a memory for storing the control rules, another memory for storing the air quality sense data, and so on.

The presence data detected by the carbon dioxide sensor is corrected by the signal processor 13 for the temperature and humidity, and is inputted to the fuzzy inference means 24 as the standardized output, which is standardized based on an output ratio to the sensor output for the concentration of carbon dioxide at the time of absence. On the other hand, the background odor data detected by the alcohol sensor is similarly corrected by the signal processor 13 for the temperature and humidity, and is inputted to the fuzzy inference means 24 as the standardized output, which is standardized based on an output ratio to the sensor output at a clean level. The fuzzy interence means 24 executes the program of the fuzzy inference in accordance with the previously determined control rules, based on the inputted presence data, background odor data and the sense data, and outputs a level of the air quality, which is the data for controlling the air conditioner and the like. In setting the control rules applied for the inference, it is assumed that the presence level is in a direct proportion to the background odor level; namely, the larger the number human occupants, the length of time of the presence, of the presence and the activity level of the human occupant, the larger the quantity of the generated body odor becomes and the higher the background odor level becomes.

Figure 9A:
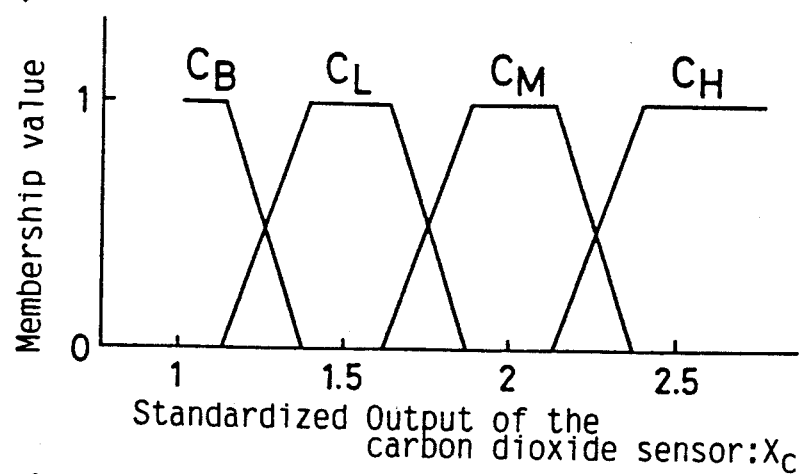
FIG. 9(a) is a graphic representation showing membership functions of the standardized output signals from the carbon dioxide sensor.
Figure 9B:
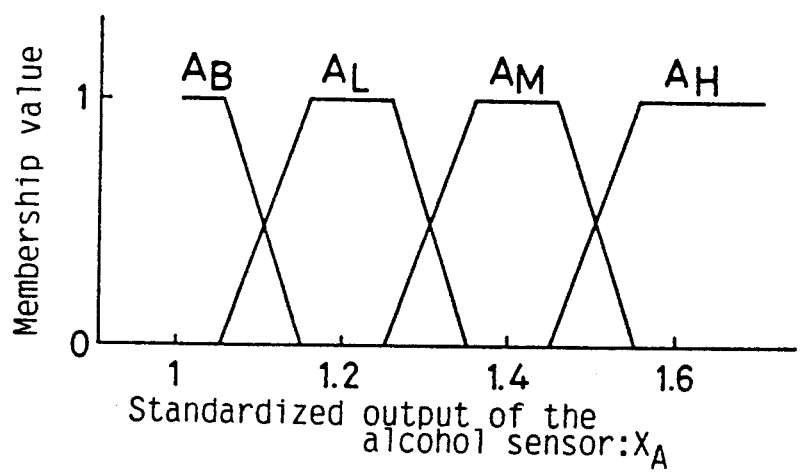
FIG. 9(b) is a graphic representation showing membership functions of the standardized output signals from the alcohol sensor.
Figure 9C:
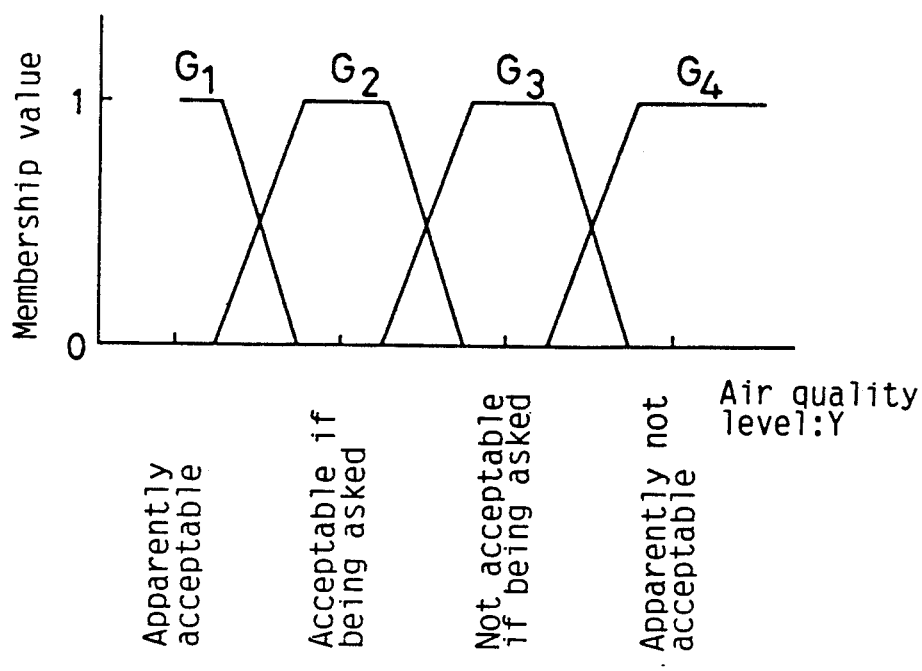
FIG. 9(c) is a graphic representation showing membership functions of the standardized air quality levels.

Examples of the membership functions to be inputted to the fuzzy inference means are shown in FIGS. 9a, 9b and 9c, respectively. The membership functions of the standardized outputs $X_C$ of the carbon dioxide sensor to be inputted to the fuzzy inference means are illustrated in FIG. 9a. Membership functions of the standardized outputs $X_A$ of the alcohol sensor are illustrated in FIG. 9b. Those of the air quality levels Y to be outputted are illustrated in FIG. 9c. In the output $X_C$ of the carbon dioxide sensor, the reference level is set as $X_B$; then the output level successively increases as represented by C, $C_M$ and $C_N$. In the output $X_A$ of the alcohol sensor, the reference level is set as $A_B$; then the output level successively increases as represented by $A_L$, $A_M$ and $A_N$. In the air quality level Y, "Very good" is defined as $G_1$, then "Fairly good" is defined as $G_2$, "Relatively bad" is defined as $G_3$ and "Very bad" is defined as $G_4$, respectively.

The control rules applied for the inference are respectively set as follows and stored in the memory.

Rule 1: IF $X_C$ is $C_B$ and $X_A$ is $A_S$ THEN Y is $G_1$
Rule 2: IF $X_C$ is $C_L$ and $X_A$ is $A_L$ THEN Y is $G_2$
Rule 3: IF $X_C$ is $C_M$ and $X_A$ is $A_M$ THEN Y is $G_3$
Rule 4: IF $X_C$ is $C_N$ and $X_A$ is $A_N$ THEN Y is $G_4$ These rules are summarized in TABLE 4. As has been previously described, in this embodiment it is assumed that: the larger are the number of the human occupants, the presence time length and the activity of the occupant, the larger becomes the generated body odor and the background odor. The outputs X of the respective sensors and the air quality levels Y are allocated as shown in TABLE 4.

TABLE 4

| $X_A$ | $A_B$ | $A_L$ | $A_M$ | $A_N$ |
|---|---|---|---|---|
| $X_C$ | | | | |
| $C_B$ | $G_1$ | | | |
| $C_L$ | | $G_2$ | | |
| $C_M$ | | | $G_3$ | |
| $C_N$ | | | | $G_4$ |

Figure 10:
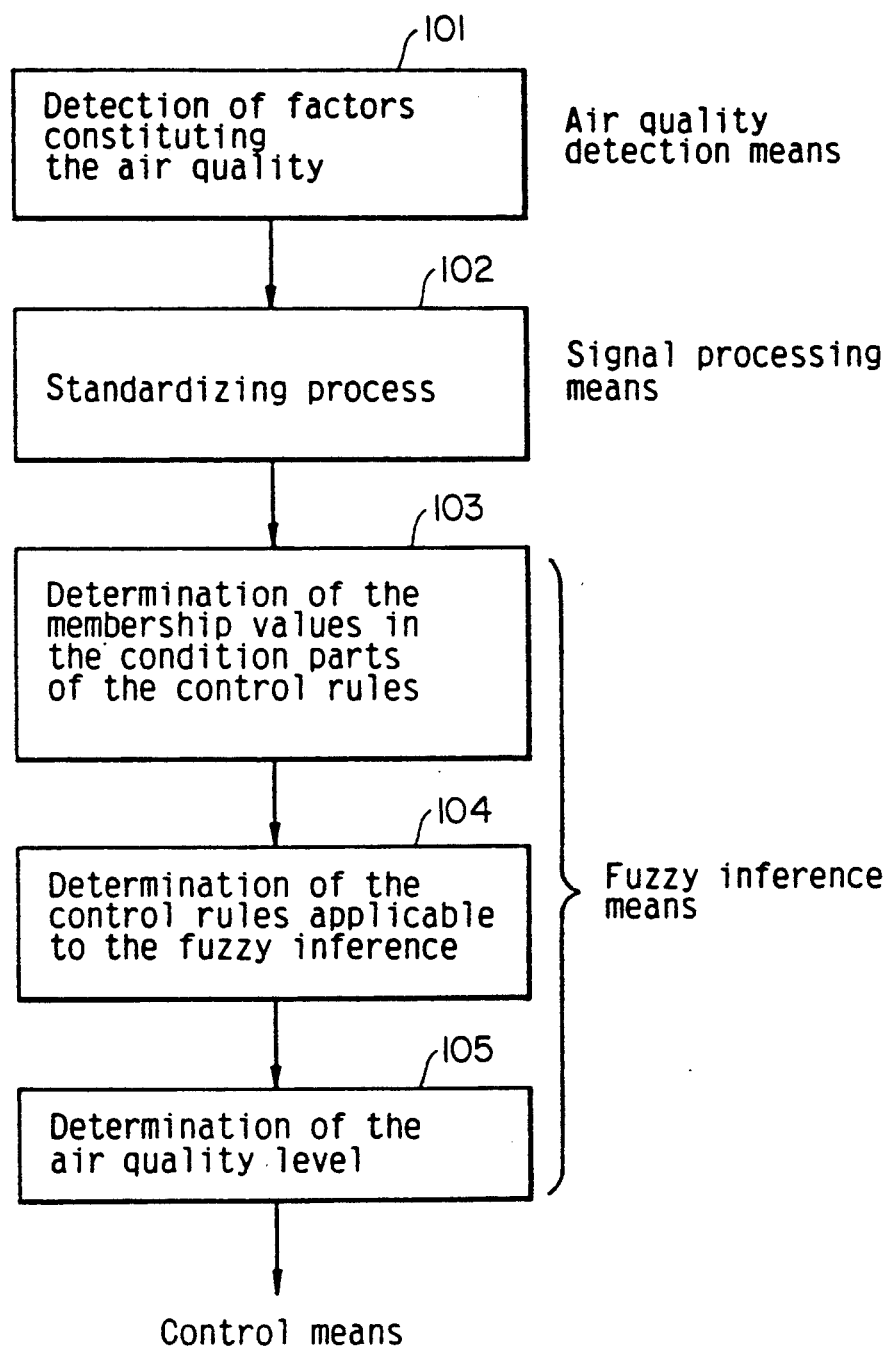
FIG. 10 is a flow chart for the fuzzy inference.

FIG. 10 shows a flow chart for the fuzzy inference.

At STEP 101, the presence, background odor, temperature and humidity are measured by the respective sensors 11a, 11b, 11c and 11d, and the measured signals are transmitted to the signal processor 13.

At STEP 102, the output of the presence sensor 11a and that of the background odor sensor 11b are processed by the signal processor 13, being corrected for the temperature and humidity. And the corrected outputs are processed for standardizing in the signal processor 13 utilizing the respective reference levels of the presence and the background odor. Then the standardized outputs of the signal processor 13 are supplied to the fuzzy inference means processor 24.

At STEP 103, the membership values for the respective outputs of the presence sensor 11a and the background odor sensor 11b are derived in said fuzzy inference processor 24 by using the membership functions of the fuzzy variables for the presence and the background odor.

At STEP 104, the degree (or rate) that the membership values of the outputs of the respective sensors satisfy the conditionsin the condition parts (IF—parts) of the respective rules is obtained, and thereby the control rules to be established are determined.

At STEP 105, the air quality levels are determined by the membership function of the action parts (THEN—parts) of the established control rules, and the corresponding resultant signals are outputted to the control device.

Any of the known logical forms (SUIRON KEISIKI) such as a direct method and an indirect method may be employed for the fuzzy inference form. In this embodiment, although only such a case wherein the fuzzy inference is executed based on the illustrated simple rules, a more delicate control of the air quality environment may be performed by setting additional rules by, for instance, allocating the finer air quality levels in the vacant spaces of TABLE 4 of this embodiment.

EXAMPLE 7

In this EXAMPLE 7, a system similar to that illustrated in Example 5 was configured, and it was confirmed to be operable. In this embodiment, five factors in total were picked up as the factors for constituting the air quality. Namely, smoking was added besides the presence and the background odor thus making a group of three factors. And other two correction factors, the environmental temperature and humidity, are further added, so as to form the five factors in total. For the detection of the smoking, a $SnO_2$ oxide semiconductor hydrogen sensor was employed by taking the concentration of hydrogen to be the indicator for the smoking. The sensors, other than the hydrogen sensor, were the same as those used in Example 6. The membership functions were established for the levels of the standardized outputs of the carbon dioxide sensor, the alcohol sensor and the hydrogen sensor as well as for the air quality level to be outputted, respectively. Then, a fuzzy inference was attempted on the basis of the control rules similar to those illustrated in Example 5. As a sense data, a data of discomfort sensed by the human occupant was also incorporated in the inference. As a result, it was found that a delicate change in the air quality in case of smoking by the human occupant also can be grasped certainly.

By employing the fuzzy inference, it is possible to determine the air quality in a manner to be very close to the human sense. And, based on this determination, the environmental air quality can be controlled more delicately than in the case of the conventional controls. These determinations and controls had hitherto been impossible in the conventional individual controls and the controls by means of establishing the initial conditions.

Although the present invention has been described in terms of the presently preferred embodiments, it is to be understood that such disclosure is not to be interpreted as limiting. Various alterations and modifications will no doubt become apparent to those skilled in the art to which the present invention pertains after having read the above disclosure. Accordingly, it is intended that the appended claims be interpreted as covering all alterations and modifications as fall within the true spirit and scope of the invention.

What is claimed is:

1. An air quality conditioning system comprising:
   an air quality detection device for detecting the air quality in an accommodation space based on at least a carbon dioxide level representing the presence of a human occupant in the accommodation space, smoke, and background odor, and for outputting detection signals;
   a signal processor having a function of at least identifying the cause for the change in the air quality based on the output signals issued from said air quality detection device, determining the degree of the change in the air quality based on a discomfort degree data for the air quality, and issuing processed signals; and
   a control device for controlling the operation of an air conditioning apparatus comprising at least one of an air conditioner, ventilator, air cleaner and any apparatus built by combining these apparatuses, based on the processed signals.

2. The air quality conditioning system in accordance with claim 1, wherein;
   said air quality detection device includes a sensor for detecting carbon dioxide, and
   said signal processor has a function of determining the presence of human occupant in the accommodation space based on the output signal from said sensor.

3. The air quality conditioning system in accordance with claim 1, wherein;
   said air quality detection device comprises at least one of a sensor for detecting carbon monoxide and a sensor for detecting hydrogen, and said signal processor has a function of determining a state of the smoking in the accommodation space, based on the output signal from said sensor.

4. The air quality conditioning system in accordance with claim 1, wherein;
said air quality detection device comprises at least one of a sensor for detecting organic solvents, a sensor for detecting volatile nitrogen-containing compounds and a sensor for detecting volatile sulfur-containing compounds, and
said signal processor has a function of determining a state of background odor in the accommodation space, based on the output signal from said sensor.

5. The air quality conditioning system in accordance with claim 1, wherein;
said air quality detection device further comprises
a means for detecting temperature and humidity of the accommodation space and
said signal processor perform correction on the outputs from said air quality detection device for the temperature and humidity.

6. The air quality conditioning system in accordance with claim 1, wherein; said signal processor further includes a fuzzy inference function and is capable of determining the level of the air quality on the basis of fuzzy inference.

* * * * *